United States Patent
Shiga (10) Patent No.: US 11,366,575 B2
(45) Date of Patent: Jun. 21, 2022

(54) INTERFACE DEVICE AND INFORMATION PROCESSING DEVICE

(71) Applicant: TOYOTA JIDOSHA KABUSHIKI KAISHA, Toyota (JP)

(72) Inventor: Kazuyuki Shiga, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/140,176

(22) Filed: Jan. 4, 2021

(65) Prior Publication Data
US 2021/0240321 A1    Aug. 5, 2021

(30) Foreign Application Priority Data

Jan. 30, 2020 (JP) .............................. JP2020-013647

(51) Int. Cl.
*G06F 3/0484* (2022.01)
*G06F 3/0488* (2022.01)

(52) U.S. Cl.
CPC .......... *G06F 3/0484* (2013.01); *G06F 3/0488* (2013.01)

(58) Field of Classification Search
CPC .. G06F 3/0484; G06F 3/0488; G06F 3/04847; G06F 3/0338; G06F 3/0362
See application file for complete search history.

(56) References Cited

U.S. PATENT DOCUMENTS

| | | | | |
|---|---|---|---|---|
| 10,969,896 | B2 * | 4/2021 | Ahnebrink | G09G 5/00 |
| 2010/0301243 | A1 * | 12/2010 | Knittel | B60K 37/06 251/129.03 |
| 2018/0032213 | A1 * | 2/2018 | Touyama | G06F 3/0487 |
| 2018/0129335 | A1 * | 5/2018 | Stone | G06F 3/0442 |
| 2019/0377486 | A1 * | 12/2019 | Powell | G06F 3/0362 |
| 2020/0034018 | A1 * | 1/2020 | Choi | G06F 3/041 |

FOREIGN PATENT DOCUMENTS

| | | |
|---|---|---|
| JP | 2012-35782 A | 2/2012 |
| JP | 2013-047973 A | 3/2013 |

* cited by examiner

*Primary Examiner* — Mong-Shune Chung
(74) *Attorney, Agent, or Firm* — Oblon, McClelland, Maier & Neustadt, L.L.P.

(57) ABSTRACT

An interface device, including: a touchscreen; one or more hardware interfaces having an operation element disposed on a surface of the touchscreen; a storage unit configured to store the operation element in association with a disabled region that is a region on the touchscreen where touch operation is disabled; and a control unit configured to disable touch operation to the disabled region that is associated with the operation element, during a prescribed period estimated that a user operates the operation element.

20 Claims, 8 Drawing Sheets

DISABLED REGION ASSOCIATED WITH OPERATION ELEMENT

DISABLED REGION ASSOCIATED
WITH OPERATION ELEMENT

FIG. 6

WHEN TOUCH OF FINGER IS
DETECTED AT ONE SPOT

WHEN TOUCH OF FINGER IS
DETECTED AT TWO SPOTS

INTERFACE DEVICE AND INFORMATION PROCESSING DEVICE

CROSS-REFERENCE TO RELATED APPLICATIONS

This application claims priority to Japanese Patent Application No. 2020-013647 filed on Jan. 30, 2020, incorporated herein by reference in its entirety.

BACKGROUND

1. Technical Field

The present disclosure relates to an interface device

2. Description of Related Art

For various uses, interface devices having a touch panel display are proliferating. For example, configuring a control panel of a vehicle by a touch panel display enables operation of a plurality of functions such as the functions of a navigation device, an audio device, and an air-conditioner in a limited area.

However, depending on a device to be operated, a hardware-type interface including an operation element may be more suitable than the touch panel. Accordingly, some interface devices, such as an in-vehicle device disclosed in Japanese Unexamined Patent Application Publication No. 2012-035782, include a combination of a touch panel and a hardware-type interface. The combination of a touch panel and a hardware-type interface achieves effective information input and output.

SUMMARY

However, when an operation element is disposed in the vicinity of a touch panel display, a problem that an erroneous input is induced arises. In an electrostatic capacitive touch panel in particular, erroneous touch operation tends to occur since the touch panel detects proximity of a finger.

The present disclosure has been made in consideration of the above problem, and it is an object of the present disclosure to restrain erroneous input to a touch panel.

A first aspect of the present disclosure relates to an interface device, including: a touchscreen; one or more hardware interfaces; a storage unit; and a control unit. The one or more hardware interfaces have an operation element disposed on a surface of the touchscreen. The storage unit is configured to store the operation element in association with a disabled region that is a region on the touchscreen where touch operation is disabled. The control unit is configured to disable touch operation to the disabled region that is associated with the operation element, during a prescribed period estimated that a user operates the operation element.

A second aspect of the present disclosure relates to an information processing device, including: a control unit; a storage unit; a touchscreen; and one or more hardware interfaces. The one or more hardware interfaces have an operation element disposed on a surface of the touchscreen. The touchscreen and the operation element are used for input and output of information. The storage unit stores the operation element in association with a disabled region that is a region on the touchscreen where touch operation is disabled. The control unit disables touch operation to the disabled region that is associated with the operation element, during a prescribed period estimated that a user operates the operation element.

As another aspect, there may be a program for causing a computer to execute an information processing method executed by the information processing device, or a non-transitory computer readable storage medium storing the program.

The present disclosure can restrain an erroneous input to a touch panel.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

In-vehicle devices using a touchscreen become popular in the field of automobiles. By enabling touch operation to a screen, space saving of an interface device can be achieved, and more information can be handled.

Meanwhile, interfaces using physical operation elements are also used extensively. The physical operation elements allow quick operation since it is not necessary to visually recognize a position that is required in the case of the touchscreen. For example, for such control as volume control of an audio device, and temperature control of an air-conditioner, operation by the physical operation elements is suitable.

Figure 1:
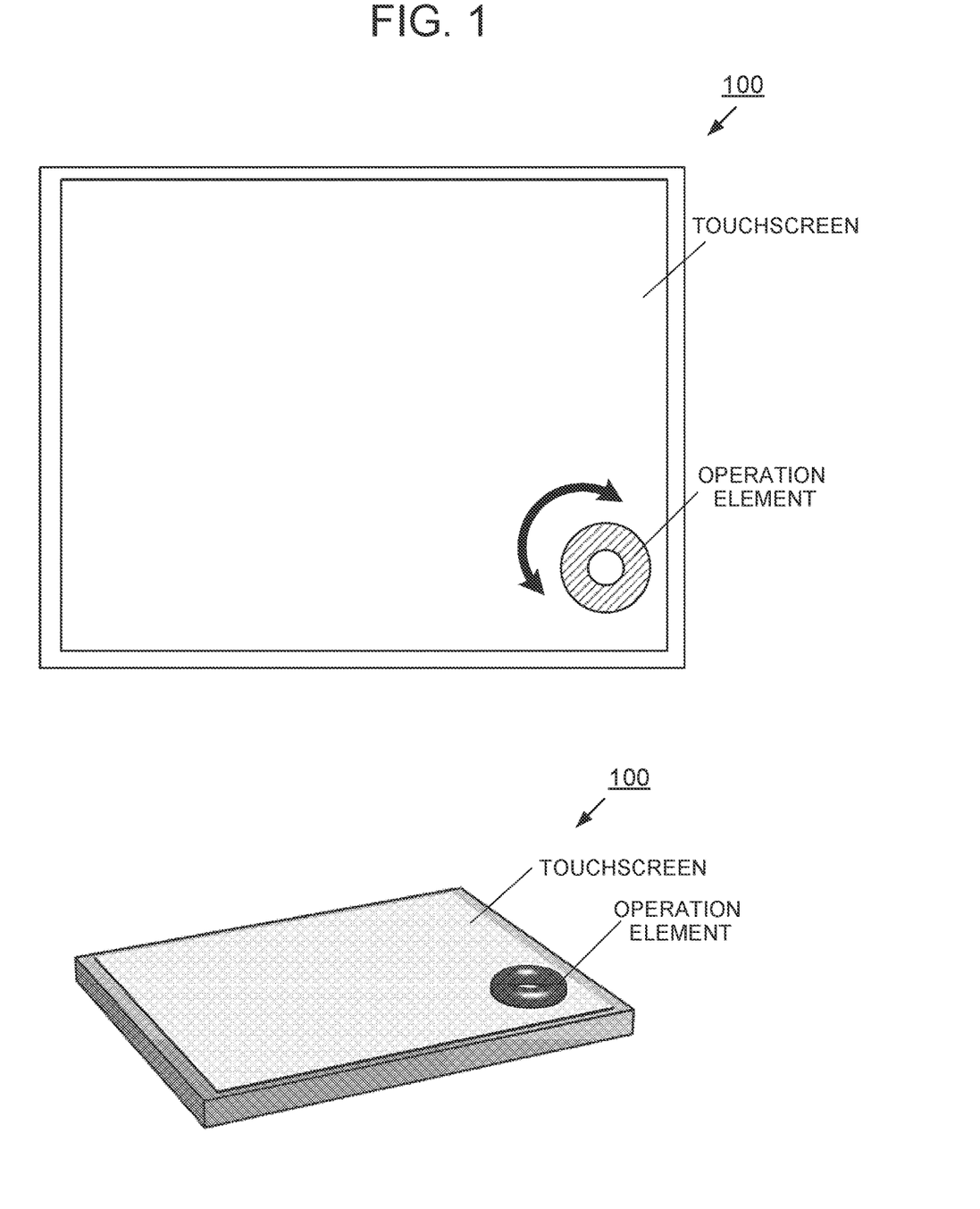
FIG. 1 is an appearance view of an interface device according to a first embodiment.

In recent years, interface devices including a combination of a touchscreen and an operation element have been devised. FIG. 1 is an appearance view (a front view and a perspective view) of an interface device as a basis of the present disclosure. The interface device includes a hardware interface having an operation element disposed on an operation surface of a touchscreen. Disposing the touchscreen and the operation element in proximity to each other can achieve both space saving and quick operation.

The hardware interface in the present disclosure is an input interface that acquires operation using a physically movable operation element. Examples of the hardware interface include a keyboard, a cursor key, a rotary encoder, and a linear encoder.

The hardware interface in an embodiment is a rotary selector for operating a dial operation element in a circumferential direction. The operation element is connected to an encoder. The operation element is configured so as to be able to acquire an operation direction (a rotation direction) and an operation amount (for example, a rotation angle, or a click count). The configuration allows smooth change of a value and smooth movement of a cursor.

Figure 2A:
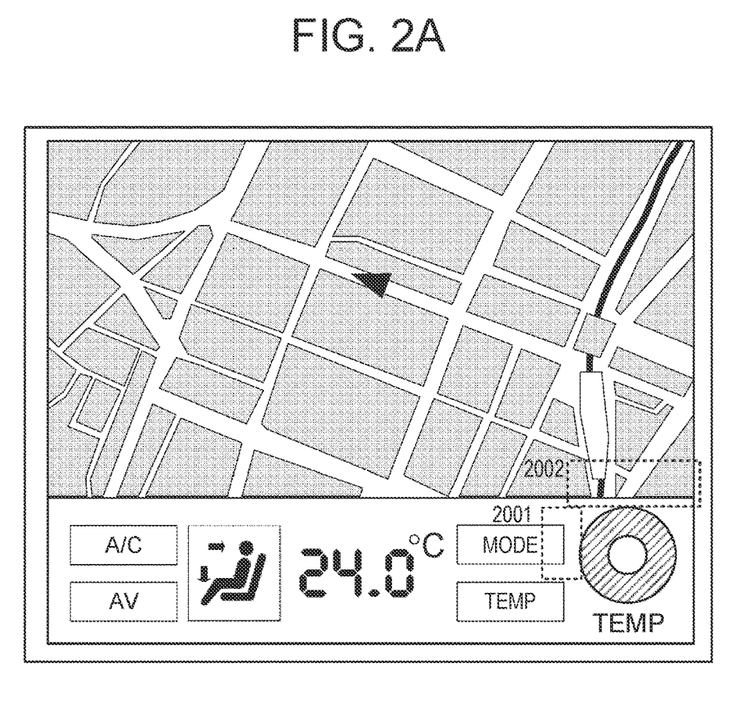
FIG. 2A illustrates contents displayed on an interface device.

FIG. 2A is a display example in the case of applying the interface device to an in-vehicle device (car navigation device).

In this example, a navigation screen and an air conditioning setting screen are output to the touchscreen, and a temperature setting operation is allocated to the hardware interface.

Different operations can be allocated to the hardware interface in accordance with the contents of the screen output to the touchscreen. In the illustrated example, the temperature setting operation is allocated to the hardware interface. However, depending on user's operation, different operation, such as change of air conditioning mode, function change, and change of scale size of a map, can be allocated.

Figure 2B:
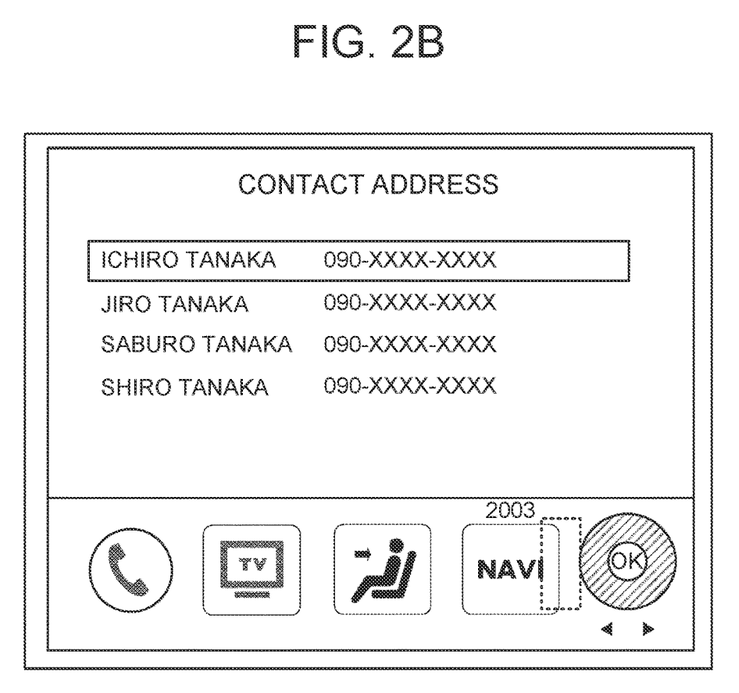
FIG. 2B illustrates contents displayed on the interface device.

FIG. 2B shows another example. In this example, the hardware interface is allocated to operation to select a contact address on the screen (operation to move the cursor up and down). Furthermore, in this example, a determination button is allocated to a region, located in a central portion of the operation element, in the touchscreen. Accordingly, determination operation can swiftly be performed after the cursor is moved.

One of the problems in the interface device having such a configuration is occurrence of an erroneous touch. Since the illustrated operation element is designed to be pinched by the fingers of a user, the fingers approach the screen. At the time, when it is determined that a finger touches the screen, there is a possibility that unintended input operation is generated.

For example, in the example of FIG. 2A, at the time of performing temperature control, there is a possibility that a finger may touch a mode button (reference numeral 2001), and thereby an air conditioning mode may be changed. There is also a possibility that a finger touches a map region (reference numeral 2002), and a central point of the navigation map may be shifted. In the example of FIG. 2B, at the time of moving the cursor, there is a possibility that a finger may touch a NAVI button (reference numeral 2003), and thereby the screen may change to a navigation mode.

As a solution to prevent this problem, there is a method of temporarily disabling a touch operation to the screen. However, uniformly prohibiting the touch operation to the screen causes such a harmful effect that operation to a region, where an erroneous touch hardly occurs, is also prohibited.

The interface device according to the present embodiment includes: a touchscreen; one or more hardware interfaces; a storage unit; and a control unit. The one or more hardware interfaces have an operation element disposed on a surface of the touchscreen. The storage unit is configured to store the operation element in association with a disabled region that is a region on the touchscreen where touch operation is disabled. The control unit is configured to disable touch operation to the disabled region that is associated with the operation element, during a prescribed period estimated that a user operates the operation element.

The touchscreen is an input device including a touch panel for acquiring touch operation, and a display device (display). The touchscreen is also called a touch panel display.

The hardware interface includes an operation element disposed on the surface of the touchscreen. The operation element is desirably stuck on the surface of the touchscreen. However, as long as the operation element is in contact with the surface, the operation element does not necessarily need to be fixed by a tape or adhesives. For example, the operation element may be hung by an arm.

The storage unit stores the operation element in association with a disabled region that is a region where touch operation is disabled. In a prescribed period that can be estimated that a user uses the operation element, the control unit disables the touch operation to the disabled region. For example, the disabled region can be defined by coordinates on the screen.

Such configuration can prevent erroneous operation performed on the touch panel while the operation element is in operation.

The hardware interface may include a plurality of operation elements. The storage unit may store the operation elements in association with the disabled regions, respectively.

When there are a plurality of operation elements, there are a plurality of regions where it is required to prevent an erroneous touch.

The disabled region may be a region incorporating a region where the operation element is disposed.

For example, when a region including an operation element and configured to be somewhat larger than the operation element is set as a disabled region, an erroneous touch can be prevented.

The operation element may also include a touch sensor that detects a touch of a hand on the operation element. The control unit may define a period when the touch sensor detects the touch of the hand as the prescribed period.

It is possible to estimate that the period when the operation element detects the touch is the period when operation is performed on the operation element.

The operation element may be a dial switch, and the control unit may define a period when the touch of the hand is detected at two or more spots as the prescribed period.

When the operation element is a dial type, there is a high possibility that the operation element is operated by two fingers. Accordingly, operation performed on the operation element can reliably be detected by setting as a determination condition that a touch is detected at two spots.

The control unit may extend the prescribed period until lapse of a first time after the touch of the hand is removed.

The first time may be defined as a rational time taken to start other operation after the operation performed on the operation element is ended.

The operation element may also include a proximity sensor that detects proximity of a hand to the operation element, and the control unit may define a period when the proximity sensor detects the proximity of the hand as the prescribed period.

The control unit may also extend the prescribed period until lapse of a second time after the proximity of the hand is removed.

In addition to the touch of the hand, the proximity of the hand is also used as a trigger, so that enhanced reliability can be achieved.

The control unit may end the prescribed period, when the touch of the hand is not detected upon lapse of a third time after the proximity of the hand is detected.

Meanwhile, it is hard to determine, based on only the proximity of the hand, whether the operation element is to be operated, or touch operation is to be performed. Accordingly, when there is no touch of the hand after the lapse of a certain amount of time, the control unit may determine that the touch operation is to be performed instead of the operation to the operation element.

The control unit may end the prescribed period, when the proximity of the hand is not removed upon lapse of a fourth time after the touch of the hand is removed.

When the proximity of the hand is not removed after the touch of the hand is removed, it is assumed that touch operation is to be performed afterward. Therefore, it is desirable to determine that the operation to the operation element is ended.

Hereinafter, embodiments of the present disclosure will be described with reference to the drawings. The configurations of the following embodiments are merely illustrative, and therefore the present disclosure is not limited to the configurations of the embodiments.

First Embodiment

Figure 3:
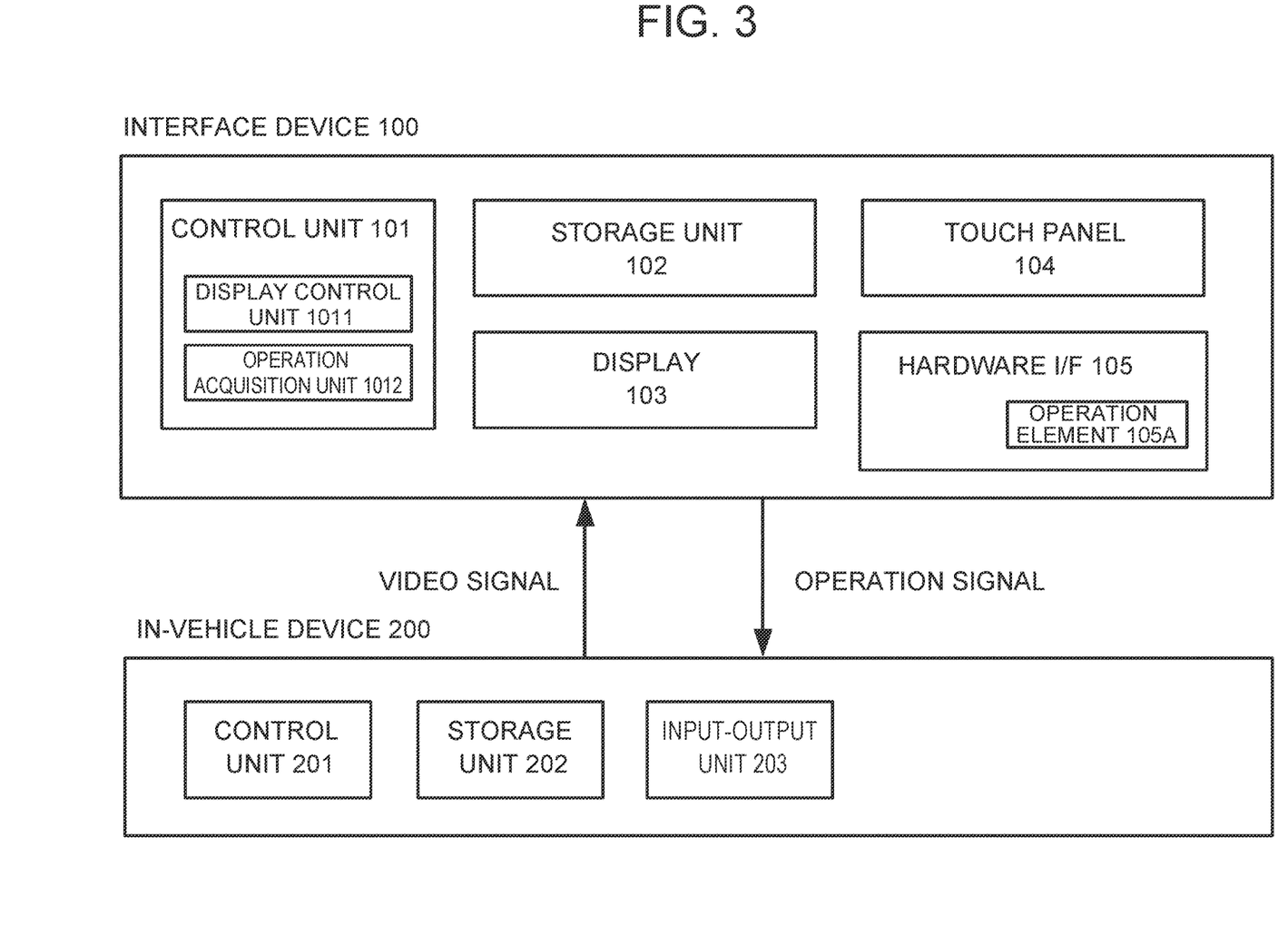
FIG. 3 is a system configuration chart of the interface device according to the first embodiment.

An outline of an in-vehicle system according to a first embodiment will be described with reference to FIG. 3. The in-vehicle system according to the present embodiment is a system in which an in-vehicle device 200 performs information input and output using an interface device 100. For example, the in-vehicle device 200 may be defined as a multifunctional car navigation device (main body). The interface device 100 may be defined as an input-output device including a touchscreen and a hardware interface (operation element) as shown in FIG. 1.

The interface device 100 acquires a video signal from the in-vehicle device 200, and outputs the signal to an incorporated display. The interface device 100 acquires operation performed on the incorporated touch panel and the hardware interface through the operation element, and outputs corresponding operation signals to the in-vehicle device 200.

The interface device 100 is configured by including a control unit 101, a storage unit 102, a display 103, a touch panel 104, and a hardware interface 105.

The control unit 101 is an arithmetic device that administers the control performed by the interface device 100. The control unit 101 may be implemented by an arithmetic processing device, such as a CPU.

The control unit 101 is configured by including two functional modules: a display control unit 1011; and an operation acquisition unit 1012. The function modules may each be implemented by executing stored programs by the CPU.

The display control unit 1011 processes a video signal acquired from the in-vehicle device 200, and outputs the processed signal to the later-described display 103.

The operation acquisition unit 1012 acquires operation performed on the later-described touch panel 104 and hardware interface 105, and generates operation signals. A specific method will be described later.

The storage unit 102 is configured by including a primary storage and an auxiliary storage. The primary storage is a memory where programs executed by the control unit 101 and data used by the control program thereof are expanded. The auxiliary storage is a device that stores programs executed in the control unit 101 and data used by the programs thereof.

The display 103 is a device that displays an image. The display 103 may be configured by a liquid crystal display, an organic EL display, an LED matrix, a projector, or the like.

The touch panel 104 is an input device disposed on top of the display 103. The touch panel 104 outputs a position on the screen touched by the user as coordinates. A combination of the display 103 and the touch panel 104 is also referred to as a touchscreen.

The hardware interface 105 is a device that converts physical operation performed on an operation element 105A into an electrical signal. The hardware interface 105 is typically a device that acquires a direction or an operation amount as described before. However, the hardware interface 105 is not limited to this. For example, the hardware interface 105 may be a device that acquires ON-OFF, or may be a device that acquires an operation angle. The operation element 105A is used in the state of being stuck on the surface of the touch panel 104.

The operation element 105A also incorporates a sensor that detects a touch of a user's finger. The touch state is notified to the control unit 101 (operation acquisition unit 1012) in real time.

The in-vehicle device 200 is a car navigation device as described before. The in-vehicle device 200 is configured by including a control unit 201, a storage unit 202, and an input-output unit 203.

The in-vehicle device 200 may be configured by a general-purpose computer. Specifically, the in-vehicle device 200 may be configured as a computer including a processor such as a CPU and a GPU, a primary storage such a RAM and a ROM, and an auxiliary storage such as an EPROM, a hard disk drive, and a removable medium. The removable medium may be a USB memory or a disc recording medium such as a CD and a DVD, for example. The auxiliary storage stores an operating system (OS), various programs, various tables, and the like. The programs stored in the auxiliary storage are loaded onto a work area of the main storage and executed therein. Through execution of the programs, each component unit and the like is controlled, and thereby each function matched with a prescribed purpose as described later can be implemented. However, some or all of the functions may be implemented by a hardware circuit such as an ASIC and an FPGA.

The control unit 201 is an arithmetic device that administers the control performed by the in-vehicle device 200. The control unit 201 provides main functions of the car navigation device. For example, the control unit 201 provides a navigation function, an audio and visual function, and the like. The control unit 201 may be implemented by an arithmetic processing device, such as a CPU.

The storage unit 202 is configured by including a primary storage and an auxiliary storage. The primary storage is a memory where programs executed by the control unit 201 and data used by the control program thereof are expanded. The auxiliary storage is a device that stores programs executed in the control unit 201 and data used by the programs.

The input-output unit 203 is an interface used for input and output of information. For example, the input-output unit 203 converts image data, corresponding to the screen and output by the control unit 201, into a prescribed video signal, and supplies the signal to the interface device 100. The input-output unit 203 also acquires an operation signal (for example, coordinates of a touch on the screen, touch pressure, operation direction, operation amount, etc.) from the interface device 100, and supplies the signal to the control unit 201.

Description is now given of the detail of a process performed by the operation acquisition unit 1012. As basic operation, the operation acquisition unit 1012 specifies, when touch operation is performed on the touch panel 104, a location where the touch operation is performed, and generates an operation signal indicating corresponding coordinates. The operation signal is continuously output while the touch continues. When the touch is removed, output of the signal is stopped.

As basic operation, the operation acquisition unit 1012 also generates, when operation is performed on the hardware interface 105, an operation signal corresponding to the operation. For example, when the hardware interface 105 is a rotary selector as described before, the operation acquisition unit 1012 generates a signal indicating an operation direction and an operation amount. The signal is generated whenever operation is performed (for example, whenever a click is generated).

The operation acquisition unit 1012 is configured so as to be operable in a normal mode and a limit mode.

The normal mode is a mode in which the process described before is unconditionally performed. Specifically, in the normal mode, both the operation to the touch panel 104 and the operation to the hardware interface 105 are acquired, and operation signals corresponding to the respective operations are generated.

Figure 4:
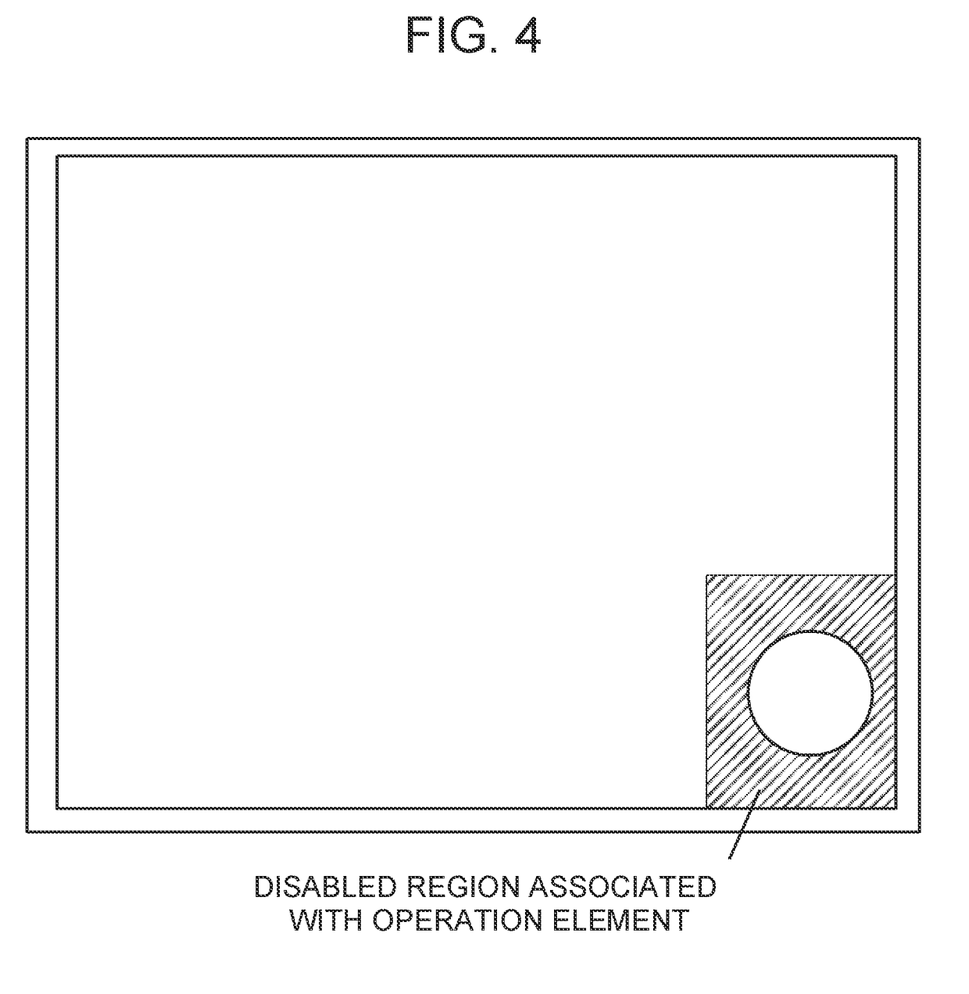
FIG. 4 shows an example of a disabled region associated with an operation element.

The limit mode is a mode in which the touch operation to a prescribed region on the touch panel 104 is disabled. As shown in FIG. 4, the prescribed region is a region associated with the operation element 105A. The prescribed region is a region (illustrated by hatching) including a region where the operation element 105A is disposed.

Although the operation acquisition unit 1012 basically operates in the normal mode, it operates in the limit mode during the period when it can be estimated that operation to the hardware interface 105 is performed. As a result, touch operation to a region in the vicinity of the operation element 105A is disabled.

Hereinafter, the prescribed region is referred to as a disabled region. The disabled region is a region where touch operation can be switched between being enabled or disabled.

Disabling a touch operation to a disabled region is referred to as "activating the disabled region", and enabling a touch operation to a disabled region is referred to as "inactivating the disabled region".

Figure 5:
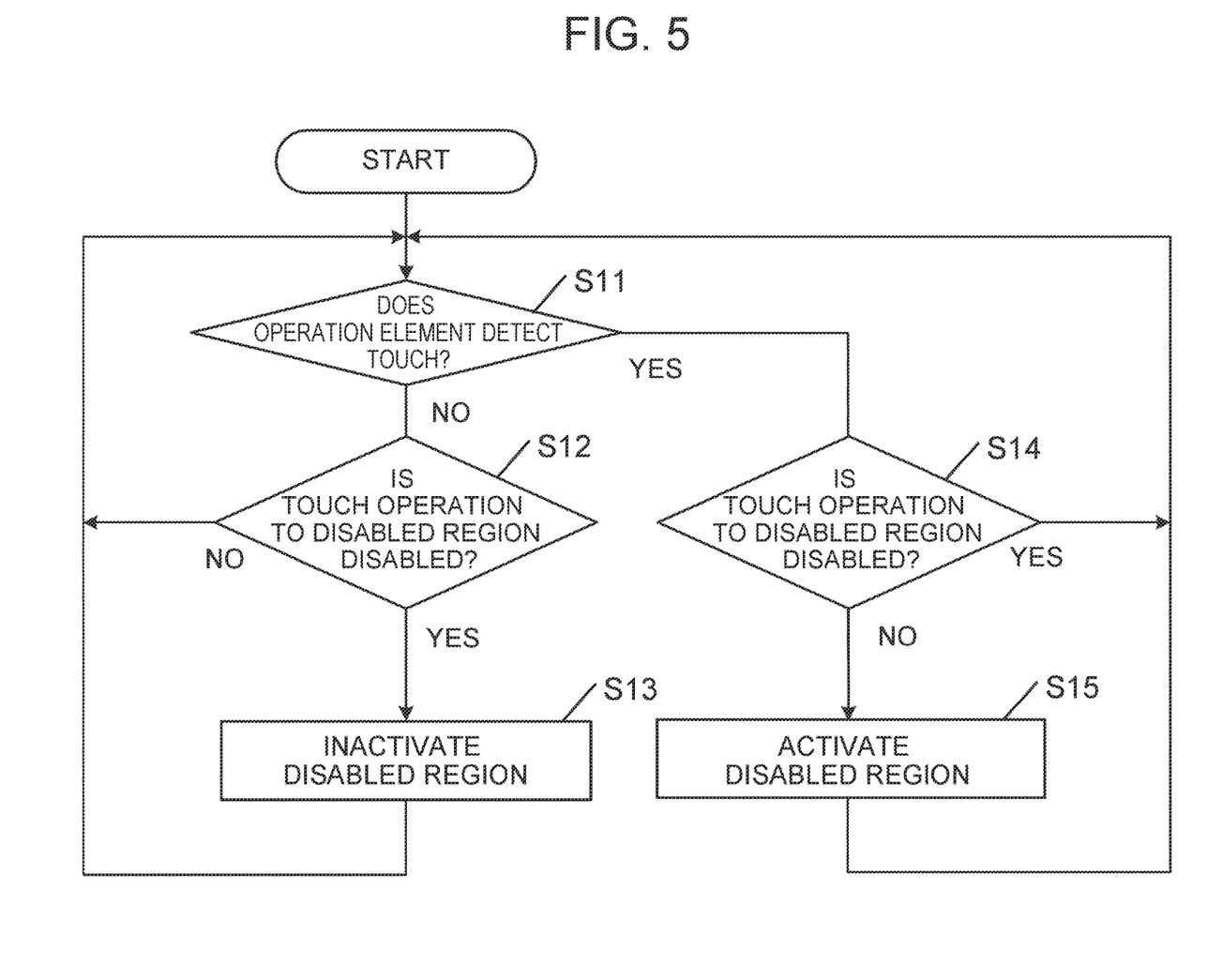
FIG. 5 is a flowchart of a process performed by an operation acquisition unit in the first embodiment.

FIG. 5 is a flowchart of a process performed by the operation acquisition unit 1012. The operation acquisition unit 1012 acquires operation performed on the touch panel 104 and the hardware interface 105, and periodically executes the process shown in FIG. 5 separately from the process of generating an operation signal.

In an initial state, the interface device 100 is set in the normal mode. In short, the disabled region is in an inactive state.

First, in step S11, the operation acquisition unit 1012 acquires from the operation element 105A a touch state of a user's finger, and determines whether or not a touch is detected. Here, when the touch of the finger is detected, the process shifts to step S14 to determine whether or not the touch operation to the disabled region is disabled (whether or not the disabled region is active). Here, when negative determination is made, the process shifts to step S15 to disable the touch operation to the disabled region. In short, the operation acquisition unit 1012 activates the disabled region, and shifts the device to the limit mode.

When the touch of the finger is not detected in step S11, the process shifts to step S12 to determine whether or not the touch operation to the disabled region is disabled. Here, when positive determination is made, the process shifts to step S13 to enable the touch operation to the disabled region. In other words, the operation acquisition unit 1012 inactivates the disabled region, and shifts the device to the normal mode. As a result, the touch operation to all the regions is enabled.

As described in the foregoing, in the first embodiment, the touch operation to the disabled region performed during the period when a user's finger touches the operation element 105A is disabled. Such configuration makes it possible to restrain an erroneous touch generated in the region around the operation element 105A while the operation element 105A is in operation.

Second Embodiment

In the first embodiment, it is determined whether or not a finger touches the operation element. In the determination, the number of fingers in touch with the operation element may be taken into consideration. For example, it becomes possible to determine the number of touching fingers by mounting in the operation element 105A a sensor capable of acquiring a region (hereinafter, a touch region) or regions in touch with a finger or fingers in a bit map format.

Figure 6:
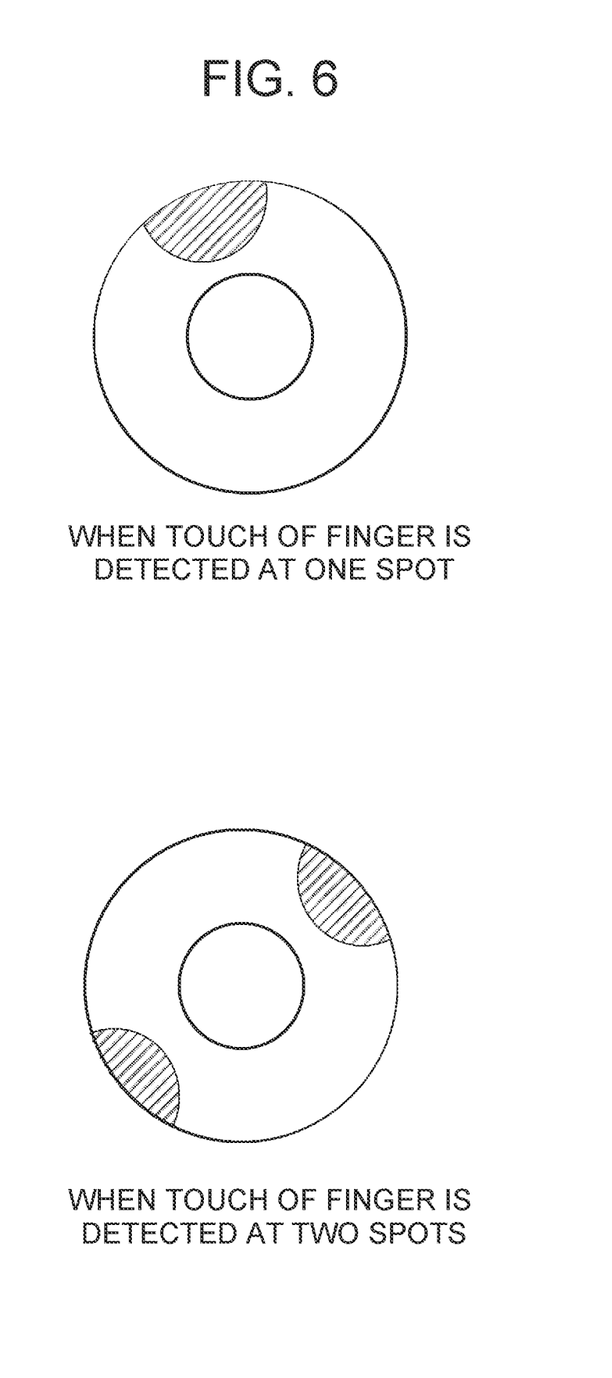
FIG. 6 is an explanatory view of a process of detecting a touch of a finger.

FIG. 6 is an explanatory view of the touch region. The region shown by hatching is the touch region. In this case, it is possible to determine how many fingers a user is using to operate the operation element, by calculating the number of touch regions with an area equal to a prescribed value or larger.

In a second embodiment, touch operation to the disabled region is disabled only when the user touches the operation element 105A by two fingers (when the number of the touch regions is two). This makes it possible to make more reliable determination that the user operates the operation element.

Third Embodiment

Figure 7A:
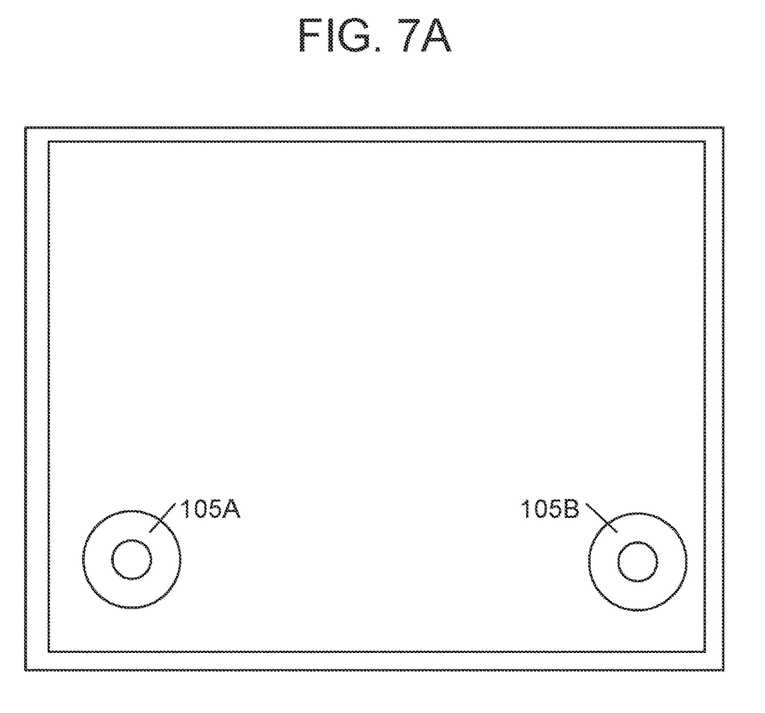
FIG. 7A is a layout drawing of the operation elements in a third embodiment.

In the first and second embodiments, the hardware interface 105 has a single operation element 105A. However, the hardware interface 105 may have two or more operation elements. For example, as shown in FIG. 7A, operation elements (operation elements 105A, 106A) may be disposed on the touchscreen.

Figure 7B:
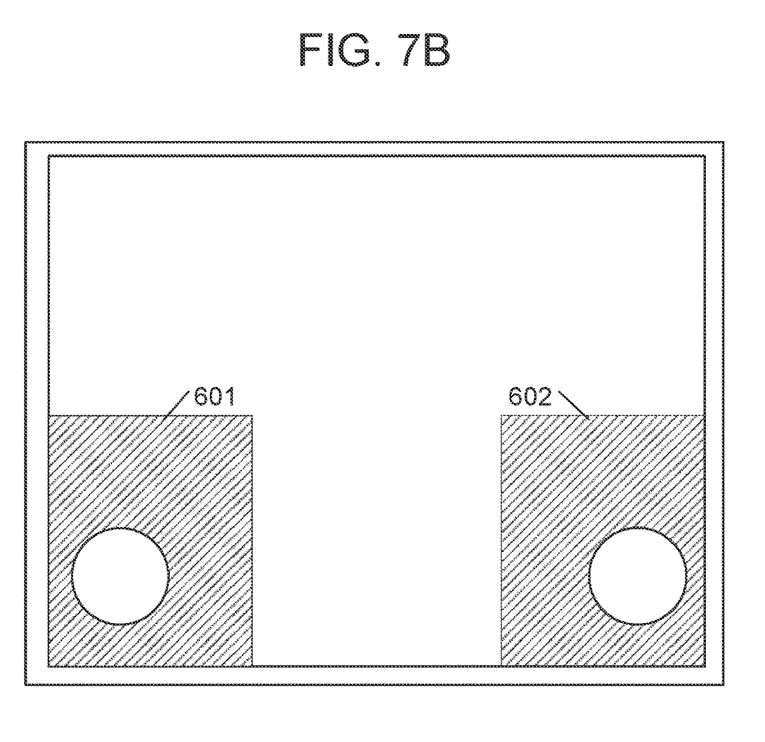
FIG. 7B is an explanatory view of the disabled regions in the third embodiment.

In the third embodiment, the storage unit 102 stores a plurality of disabled regions in association with the operation elements, respectively. FIG. 7B shows the disabled regions. Reference numeral 601 denotes a disabled region corresponding to the operation element 105A, and reference numeral 602 denotes a disabled region corresponding to the operation element 105B.

Figure 8:
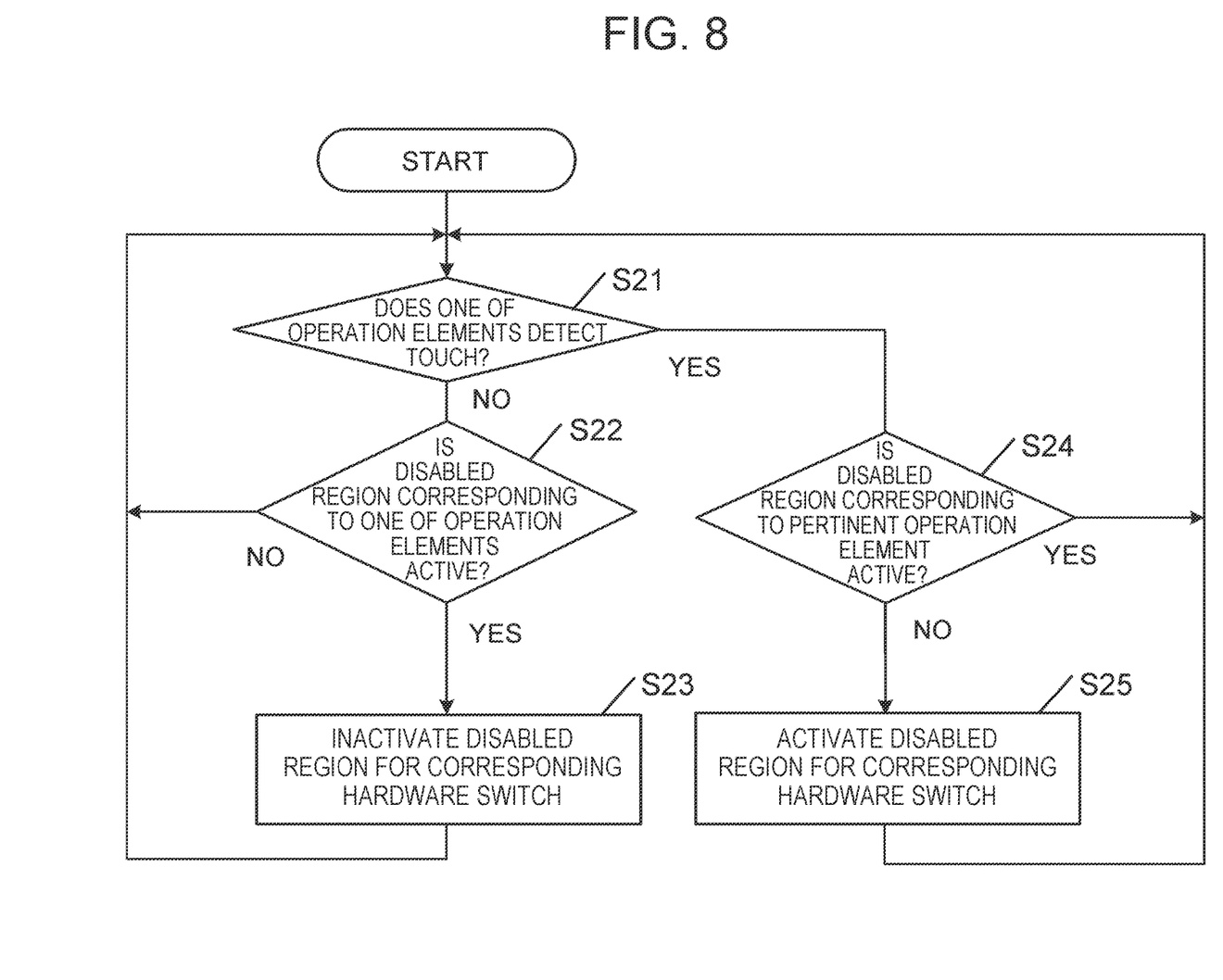
FIG. 8 is a flowchart of a process performed by the operation acquisition unit in the third embodiment.

FIG. 8 is a flowchart of a process performed by the operation acquisition unit 1012 in the third embodiment.

First, in step S21, the operation acquisition unit 1012 determines whether or not one of the operation element 105A and the operation element 105B acquires a touch of a finger. Here, when the touch of the finger is detected in one of the operation elements, the process shifts to step S24 to determine whether or not the disabled region, corresponding to the operation element that is in touch with a finger, is active. Here, when negative determination is made, the process shifts to step S25 to activate the disabled region corresponding to the pertinent operation element. In short, touch operation to the disabled region is disabled.

When no operation element detects the touch of the finger in step S21, the process shifts to step S22 to determine whether or not the disabled region corresponding to one of the operation elements is active. Here, when positive determination is made, the process shifts to step S23 to inactivate the corresponding disabled region. As a result, the touch operation to all the regions is enabled.

Thus, in the third embodiment, the operation elements are associated with the disabled regions, respectively. When one of the operation elements detect a touch of a finger, the corresponding disabled region is activated. With the configuration, the area of the disabled region can be minimized in the aspect where the operation elements are disposed on the touchscreen.

Fourth Embodiment

In the first to third embodiments, the touch sensor is used to detect operation performed on the operation element. However, instead of the touch sensor, a proximity sensor may be incorporated in the operation element. Specifically, in step S11 (S21), proximity of a finger may be determined instead of the touch of a finger. This configuration makes it possible to disable touch operation before a finger touches the operation element.

When the touch of a hand is not detected upon lapse of a prescribed time after the proximity of the hand is detected, it may be determined that the user has no intention to operate the operation element, and therefore setting of the disabled region may be released based on the determination.

When the touch of a hand is not removed upon lapse of a prescribed time after the proximity of the hand is removed, it may be determined that the operation of the operation element is ended, and setting of the disabled region may be released based on the determination.

Modifications

The aforementioned embodiments are merely examples, and the present disclosure may appropriately be changed without departing from the concept thereof.

For example, the processes or means described in the present disclosure can freely be combined and implemented without departing from the range of technical consistency.

In the above embodiments, the disabled region is immediately inactivated when the touch (or proximity) of a finger is removed. However, a prescribed delay time may be added in between the removal of the touch (or proximity) of the finger and the inactivation of the disabled region.

In the description of the embodiments, the aspect in which the interface device 100 and the in-vehicle device 200 are separated haven been illustrated. However, the interface device 100 and the in-vehicle device 200 may be the same device. In this case, the control unit 101 may perform the processes performed by the control unit 201.

Moreover, the processes described to be performed by one device may be distributed to and executed by a plurality of devices. Alternatively, the processes described to be executed by different devices may be executed by one device. In a computer system, hardware configuration (server configuration) that implements each function may flexibly be changed.

The present disclosure can also be implemented when a computer program, mounted with the functions described in the embodiments, is supplied to a computer, and one or more processors included in the computer read and execute the program. Such a computer program may be provided to the computer by a non-transitory computer readable storage medium that is connectable with a system bus of the computer, or may be provided to the computer through a network. Examples of the non-transitory computer readable storage medium include disks or discs of any types, including magnetic disks (such as floppy (registered trademark) disks, and hard disk drives (HDDs)) and optical discs (such as CD-ROMs, DVD discs, Blu-ray disc), and media of any types suitable for storing electronic commands, including read-only memories (ROMs), random-access memories (RAMs), EPROMs, EEPROMs, magnetic cards, flash memories, and optical cards.

What is claimed is:

1. An interface device, comprising:
a touchscreen;
one or more hardware interfaces having an operation element disposed on a surface of the touchscreen; and
circuitry configured to
store information in a memory circuit that associates the operation element with a disabled region that is a region on the touchscreen where touch operation is disabled, and
disable touch operation to the disabled region that is associated with the operation element, during a prescribed period estimated that a user operates the operation element, wherein:
the operation element includes a dial switch, and
the circuitry is further configured to define a period when the touch of the hand is detected at two or more spots as the prescribed period.

2. The interface device according to claim 1, wherein:
the hardware interface has a plurality of the operation elements; and
the circuitry is further configured to store information in the memory circuit that associates the operation elements with the disabled regions, respectively.

3. The interface device according to claim 1, wherein the disabled region is a region incorporating a region where the operation element is disposed.

4. The interface device according to claim 1, wherein:
the operation element further includes a touch sensor that detects a touch of a hand with the operation element; and
the circuitry is further configured to define a period when the touch sensor detects the touch of the hand as the prescribed period.

5. The interface device according to claim 4, wherein the circuitry is further configured to extend the prescribed period until lapse of a first time after the touch of the hand is removed.

6. The interface device according to of claim 4, wherein:
the operation element includes a proximity sensor that detects proximity of a hand to the operation element; and
the circuitry is further configured to define a period when the proximity sensor detects the proximity of the hand as the prescribed period.

7. The interface device according to claim 6, wherein the circuitry is further configured to extend the prescribed period until lapse of a second time after the proximity of the hand is removed.

8. The interface device according to claim 6, wherein the circuitry is further configured to end ends the prescribed period when the touch of the hand is not detected upon lapse of a third time after the proximity of the hand is detected.

9. The interface device according to claim 6, wherein the circuitry is further configured to end the prescribed period when the proximity of the hand is not removed upon lapse of a fourth time after the touch of the hand is removed.

10. An information processing device, comprising:
a touchscreen;
one or more hardware interfaces having an operation element disposed on a surface of the touchscreen, wherein the touchscreen and the hardware interface are used for input and output of information; and
processing circuitry coupled to a memory circuit and configured to
store information in the memory circuit that associates the operation element with a disabled region that is a region on the touchscreen where touch operation is disabled, and
disable touch operation to the disabled region that is associated with the operation element, during a prescribed period estimated that a user operates the operation element, wherein:
the operation element is a dial switch, and
the circuitry is further configured to define a period when the touch of the hand is detected at two or more spots as the prescribed period.

11. The interface device according to claim 1, wherein the circuitry is further configured to disable the touch operation only when the touch of the hand is detected at the two or more spots.

12. The information processing device according to claim 10, wherein the disabled region is a region incorporating a region where the operation element is disposed.

13. The information processing device according to claim 10, wherein:
the hardware interface has a plurality of the operation elements; and
the processing circuitry is further configured to store information in the memory circuit that associates the operation elements with the disabled regions, respectively.

14. The information processing device according to claim 10, wherein:
the operation element includes a touch sensor that detects a touch of a hand with the operation element; and
the processing circuitry is further configured to define a period when the touch sensor detects the touch of the hand as the prescribed period.

15. The information processing device according to claim 14, wherein the processing circuitry is further configured to extend the prescribed period until lapse of a first time after the touch of the hand is removed.

16. The information processing device according to claim 14, wherein:
the operation element includes a proximity sensor that detects proximity of a hand to the operation element; and
the processing circuitry is further configured to define a period when the proximity sensor detects the proximity of the hand as the prescribed period.

17. The information processing device according to claim 16, wherein the processing circuitry is further configured to extend the prescribed period until lapse of a second time after the proximity of the hand is removed.

18. The information processing device according to claim 16, wherein the processing circuitry is further configured to end the prescribed period when the touch of the hand is not detected upon lapse of a third time after the proximity of the hand is detected.

19. The information processing device according to claim 16, wherein the processing circuitry is further configured to end the prescribed period when the proximity of the hand is not removed upon lapse of a fourth time after the touch of the hand is removed.

20. The information processing device according to claim 12, wherein the processing circuitry is further configured to disable the touch operation only when the touch of the hand is detected at the two or more spots.

* * * * *